Patented June 6, 1933

1,912,585

UNITED STATES PATENT OFFICE

FRANK E. LICHTENTHAELER, OF NEWTON HIGHLANDS, MASSACHUSETTS

METHOD OF CONCENTRATING DILUTE AQUEOUS SOLUTIONS

No Drawing. Application filed September 17, 1930. Serial No. 482,641.

The present invention relates to methods of concentrating aqueous solutions.

The complete concentration of many organic substances, particularly from dilute solutions, presents a number of difficulties, especially in such cases where constant boiling mixtures are formed or where the vapor pressure characteristics are such as to militate against fractional distillation. Ethyl alcohol is a substance which forms a constant boiling mixture with water, and acetic acid is an example of the latter class, wherein complete concentration cannot be effected by fractional distillation unless the original concentration is above a certain critical value.

The object of the present invention is to provide a method particularly useful with dilute aqueous solutions for effecting substantially complete concentrations of substances, notwithstanding unfavorable characteristics which might prevent complete concentration by distillation methods.

With this object in view, one feature of the invention as applied to the substantially complete concentration of dilute solutions, contemplates treating the solution with a hydrate forming salt, which is adapted to take up water from the solution as water of crystallization, and thereafter extracting the concentrate from the surfaces of the hydrated salt by a non-aqueous solvent in which the salt is insoluble.

The mixture extracted from the hydrated salt comprises a solution of the concentrate in the extraction agent. In other words, the process carried thus far results in the conversion of an aqueous solution into a non-aqueous solution which may in itself be useful for many purposes without further treatment. However, where recovery of a substance in concentrated form is desired, it may be separated from the extraction agent by subsequent treatment such as fractional distillation.

The present invention is particularly useful in reducing or eliminating the aqueous dilution of substances which are originally in fairly dilute condition. For example, in the process hereinafter specifically described of concentrating acetic acid, it is possible to concentrate a 10% solution to glacial in a single operation, while an acid of originally 90% concentration may not be carried by the same process to a concentration much higher than 92%. The characteristics of the hydrate forming salt which determine the selection of a particular salt are that it be insoluble and non-reactive with the concentrate, that it be cheap, and also have the desirable property of binding large quantities of water. The paradoxical nature of the invention in that it makes for concentration of dilute solutions but not for concentration of initially concentrated solutions appears to be due to the insolubility of the salt in the concentrate.

A further and important feature of the invention contemplates the use of a pre-wetting agent for completely wetting the hydrate forming salt prior to mixture thereof with the solution to be concentrated. This pre-wetting agent is a substance having the same characteristics specified for the extraction solvent, and for reasons of convenience is preferably identical therewith. The object of the pre-wetting is two-fold:—first, to prevent coalescence of the crystals into a solid mass, and second, to retard the water binding reaction of the salt. The crystallization of the salt in the presence of the pre-wetting agent practically permits each particle of salt to act individually with the water. The resulting crystal mass is loose and non-coalescent, and is in such form as to be readily penetrable by the extraction agent without necessity for mechanical breaking or pulverizing. The use of such an agent not only favors completeness of reaction, but also completeness of extraction. The use of the pre-wetting agent gives important advantages, even though the concentrating reaction is not to be carried to completion.

The method will now be described as embodied specifically in a method of concentrating 10 per cent acetic acid to glacial.

The preferred hydrate forming salt for this purpose is magnesium sulphate, which has the advantages of stability, capacity for fixing a large amount of water in the hydrate, and favorable crystalline form, both in the anhydrous and hydrated states. This salt combines with 7, 6, 2 or 1 molecules of water to form corresponding hydrates. It is preferred to form the hexa-hydrate; accordingly the amount of anhydrous salt to be used is calculated on the amount necessary to fix 6 molecules of water for each molecule thereof. The hexa-hydrate is to be preferred to the higher hydrate because it has greater stability, and to the lower hydrates because of its greater water fixing properties. Both the anhydrous and hydrated salts are insoluble in concentrated acetic acid, but the anhydrous salt is quite soluble in water as well as in the 10 per cent acetic acid solution. With magnesium sulphate as the hydrate forming salt, the initial acetic acid concentration should not be much higher than 10 per cent. The concentrating effect of the salt becomes less as the initial concentration is increased above 10%, until a critical or turning point is reached, above which the solution cannot react with a sufficient amount of salt to fix all the water. Below this so-called critical concentration, the acetic acid present has no appreciable effect on formation of hydrate to the extent of water present; above this critical concentration, the formation of hydrate is less than that required to fix all the water, even when an excess of hydrate forming salt is used.

Inasmuch as the hydrate forming salt is insoluble in the concentrate, it is believed that the presence of an initial critical concentration is due in part, if not wholly, to the fact that the solubility of the salt diminishes as the initial concentration increases. The actual value of the initial critical concentration depends, of course, on the solubility and the fixing properties of the salt, as well as on the character of the solution to be concentrated; with other salts and other solutions, the process may work with higher initial concentrations, but it is to be pointed out that such a critical or turning point probably exists in any case. The precise determination of the actual value of the critical concentration is not of great importance, because the original solution can always be sufficiently diluted to a point which is favorable to effective concentration by the process.

For concentrating 10 per cent acetic acid, a weight of freshly dehydrated, finely divided, magnesium sulphate equal to the weight of the dilute acid is employed, this relation giving the correct quantity of salt to form the hexa-hydrate. Although it is desirable to measure the quantity of salt fairly accurately, still where this cannot be done, because of uncertainty of the degree of initial concentration of the acid, an excess of salt is to be preferred to a deficiency, because in the former case, some lower hydrates may be formed, whereas in the latter case, some of the salt would tend to crystallize as the relatively less stable hepta-hydrate.

The salt is now wet with acetone, as a pre-wetting or retarding agent. The amount of this agent is not critical, the preferred amount being that required to wet or coat each particle of salt without excess. The weight of acetone is about eighty per cent of the weight of anhydrous magnesium sulphate.

The anhydrous salt thus wet is cooled, and the dilute acetic is quickly and thoroughly mixed therewith. Cooling is usually necessary to prevent the heat generated by the reaction from vaporizing or decomposing any of the materials. For small quantities of acid, batch mixing is suitable. Quick mixing is desirable, otherwise a small part of the water might act on a relatively large amount of salt to form the lower hydrates, while leaving an excess of water to be taken up by the remainder of the salt. The mixing should also be thorough, to prevent the reverse action, namely, a local action by which a part of the salt might combine with too much water to form the hepta-hydrate. In large scale operations, continuous mixing of converging small streams is most effective, not only because of the thoroughness of mixing, but also because of ease of cooling.

By the above reaction, small crystals of magnesium sulphate hydrate are precipitated or crystallized. The surfaces of the crystals are wet with a mixture of the desired concentrate with the pre-wetting agent, namely, pure acetic acid and pure acetone. It is to be pointed out that, although the complete reaction probably involves actual solution of each particle of the anhydrous salt and subsequent precipitation of the hydrated salt, there is usually no visible evidence of these effects. The reaction is so rapid that the hydrated salt appears to form directly from the anhydrous salt as the solution is mixed therewith.

During and after the formation of the crystals, the wetting agent performs several important functions. In the first place, by coating each particle of the salt, it acts as a retardent to the hydrating reaction; that is to say, it forms a barrier through which the regents must penetrate or diffuse, and thus permits sufficient time for thorough mixing of the dilute acid with the salt. Each particle of the salt is therefore individually exposed to the action of its proper amount of water, and the hydrating reaction goes to completion in orderly fashion. Thus the formation of the desired hydrate is under control; with pre-wetting it is possible to obtain practically all of the crystals as hexa-hydrate. In the second place, the wetting agent prevents coalescence of the crystal hydrate; in other words, it acts in the manner of a lubricant to keep the individual crystals separated and thus to maintain the crystalline mass in a loose and non-coalescent condition. Without the use of such a pre-wetting agent, the crystals tend to form concrescent masses, which usually must be broken up mechanically; even under mechanical breaking, a considerable amount of concentrate may be occluded in small interstices of the crystals. A further advantage of the wetting agent is that it causes all of the surfaces of the formed crystals to be completely wet with the mixture of acetic acid and acetone, thus facilitating the removal of the concentrate from the crystal surfaces.

The crystal mass is now washed by a solvent or extraction agent, which is preferably pure acetone. The acetone having no solubility for the salt, removes only the concentrated acetic acid. Since a considerable amount of acetone may be required for removal of the acetic acid, it will be seen that the requirement of insolubility of the salt in the acetone is necessary, where complete concentrations are desired, otherwise the presence of a small amount of hydrated salt would introduce water in the subsequent distillation.

The substance removed from the crystal mass comprises a mixture of glacial acetic acid and acetone. The acetone is now distilled from the acetic acid. Any suitable method of fractional distillation and rectification may be performed without difficulty because of the wide difference of boiling points, and also because of the fact that no constant boiling mixture is formed. The fractional distillation may be carried as far as desired. In some cases, complete separation may not be necessary, as in the case where the final desired product is a mixture of acetic acid and acetone in predetermined proportions. However, the separation may be made practically complete, giving acetone as distillate and glacial acetic acid as residue.

The acetone distilled off from the acetic acid is in condition for further use in the process, either as a pre-wetting agent, or as an extraction agent. Also the acetone which is left in contact with the crystal mass may be recovered. The mass of crystals is first heated gently to drive off the acetone, and finally to a considerably higher degree, to dehydrate the crystals.

Although the invention has been specifically described as embodied in a method of concentrating dilute acetic acid to glacial, it will be understood that the invention is not limited to this specific example, but may be employed for the concentration of other substances and by the use of different reagents. The concentration is not necessarily complete; in fact, concentration as defined herein is partial or complete elimination of aqueous dilution, and therefore includes also the process of substituting for an aqueous solvent a non-aqueous one, whatever the final concentration may be.

The general characteristics of the several reagents are sufficiently outlined in the specific example given above, but they will now be briefly summarized. The hydrate forming salt should be chemically stable, capable of binding a considerable amount of water in stable form at ordinary temperatures and pressures, soluble in water and insoluble in and non-reactive with the concentrate. Crystalline form in the hydrate is not essential, it being understood that the term "water of crystallization" is used in its well-known sense to specify water which is fixed or bound by addition to the molecules of a salt when the latter comes out of solution. If the concentration is to proceed to completion, that is, if all of the water is to be removed, the original solution should be diluted below the critical initial concentration in order that sufficient salt may react to bind the water. Both the pre-wetting or retarding agent and the extraction agent should have the characteristics of dissolving the concentrate, but not the salt, although they should be capable of wetting the surfaces of the salt. Also, where complete concentrations are desired, they should be capable of separation from the concentrate by physical methods, such as fractional distillation. These agents are preferably identical to avoid the necessity of subsequent separation.

Having thus described the invention, what is claimed is:

1. The method of concentrating dilute acetic acid to glacial which consists in adding to the dilute acid a quantity of anhydrous magnesium sulphate sufficient to take up substantially all of the water of the solution as water of crystallization, the solution being sufficiently dilute to dissolve the requisite quantity of the salt, permitting the formation of crystals, and washing the crystals with acetone.

2. The method of concentrating dilute aqueous solutions which consists in adding to the solution an anhydrous hydrate forming salt insoluble in and chemically non-reactive with the concentrate but soluble in the solution in an amount sufficient to take up water of crystallization, retarding the crystallizing reaction by initially wetting the anhydrous salt with a non-aqueous water soluble agent in which the salt is insoluble, permitting the hydrated salt to crystallize, and extracting the concentrate with a non-aqueous solvent.

3. The method of concentrating dilute aqueous solutions which consists in wetting an anhydrous salt with a non-aqueous water soluble agent to prevent coalescence of the salt, the salt being insoluble in said agent, mixing the salt with the solution to hydrate the salt, and removing the concentrate from the hydrate by a non-aqueous solvent in which the salt is insoluble.

4. The method of concentrating dilute aqueous solutions which consists in wetting an anhydrous hydrate forming salt with a non-aqueous agent in which the salt is insoluble and in which water and the concentrate are soluble, mixing the salt with the solution to take up water as water of crystallization, and extracting the concentrate with a non-aqueous solvent.

5. The method of concentrating dilute aqueous solutions which consists in wetting an anhydrous hydrate forming salt with a non-aqueous agent in which the salt is insoluble and in which water and the concentrate are soluble, mixing the salt with the solution to take up water as water of crystallization, and extracting the concentrate with a non-aqueous solvent identical with the wetting agent.

6. The method of concentrating aqueous solutions which consists in taking a quantity of anhydrous hydrate forming salt sufficient to fix the water in the solution as hydrate, the salt being insoluble in the material to be concentrated and the solution being sufficiently dilute to dissolve the requisite quantity of the salt, wetting the salt with an agent soluble in water to prevent coalescence of the salt, said agent being incapable of dissolving the salt and capable of being separated from the concentrate, mixing the wetted salt and the solution to form the hydrated salt, extracting the concentrate from the salt with a solvent in which the salt is insoluble, and separating the solvent from the concentrate.

7. The method of concentrating dilute acetic acid which consists in wetting a quantity of anhydrous hydrate forming salt with a water soluble non-aqueous pre-wetting agent in which the salt is insoluble to prevent coalescence of the salt particles, the salt being insoluble in and non-reactive with concentrated acetic acid and soluble in the dilute acetic acid, mixing the salt and the dilute acid to form the hydrated salt, and washing the hydrated salt thus formed with an extraction agent identical with the pre-wetting agent.

8. The method of concentrating dilute acetic acid which consists in wetting anhydrous magnesium sulphate with a non-aqueous water soluble pre-wetting agent in which the acetic acid is soluble and the salt is insoluble, mixing the salt with the dilute acid to hydrate the former and to form crystals thereof, and washing the crystals with an extraction agent identical with the pre-wetting agent to extract the acetic acid.

9. The method of concentrating dilute acetic acid which consists in wetting anhydrous magnesium sulphate with a non-aqueous water soluble pre-wetting agent in which the acetic acid is soluble and the salt is insoluble, mixing the salt with the dilute acid to hydrate the former and to form crystals thereof, and washing the crystals with an extraction agent identical with the pre-wetting agent to extract the acetic acid, separating the acetic acid and the extraction agent by fractional distillation, and heating the magnesium sulphate first to recover the extraction agent and then to dehydrate the salt.

10. The method of concentrating dilute acetic acid which consists in taking a quantity of anhydrous magnesium sulphate sufficient to fix the water of the solution as a hydrate, the solution being sufficiently dilute to dissolve the requisite quantity of the magnesium sulphate, wetting the magnesium sulphate with acetone to retard the subsequent hydrating reaction, and to prevent coalescence of the crystals, mixing the dilute acid and the magnesium sulphate to precipitate the latter as hydrate, washing with acetone to extract the acetic acid, and separating the acetone and the acetic acid by fractional distillation.

11. In the method of concentrating aqueous solutions by mixing with the solution an anhydrous hydrate forming salt capable of forming several hydrates, the salt being insoluble in and non-reactive with the concentrate, the steps which consist in measuring the salt to provide a quantity capable of fixing the water as a selected hydrate, and controlling the formation of the selected hydrate by pre-wetting the anhydrous salt with a non-aqueous water soluble retarding agent.

12. In the method of concentrating aqueous solutions by mixing with the solution anhydrous magnesium sulphate, the steps which consist in measuring the magnesium sulphate to provide a quantity capable of fixing the water as hexa-hydrate, and controlling the formation of the hexa-hydrate by pre-wetting the anhydrous salt with a non-aqueous water soluble retarding agent in which the magnesium sulphate is insoluble.

13. In the method of concentrating aqueous solutions by mixing with the solution an anhydrous hydrate forming salt, the step which consists in pre-wetting the salt with a non-aqueous water soluble liquid in which the salt is insoluble to prevent coalescence of the hydrated salt.

14. In the method of concentrating dilute aqueous solutions by mixing with the solution an anhydrous hydrate forming salt, the step which consists in wetting the anhydrous salt with a non-aqueous water soluble liquid retarding agent through which the water penetrates to retard the hydrating reaction, said wetting agent being incapable of dissolving the salt.

15. The method of concentrating dilute aqueous solutions which consists in wetting an anhydrous hydrate forming salt with a water soluble non-aqueous agent in which the salt is insoluble, mixing the salt with the solution, the solution being diluted below the critical concentration at which a sufficient quantity of the salt is soluble to take up all of the water of crystallization, and extracting the concentrate with a non-aqueous agent.

In testimony whereof I have signed my name to this specification.

FRANK E. LICHTENTHAELER.